United States Patent [19]
Geboers et al.

[11] Patent Number: 4,518,828
[45] Date of Patent: May 21, 1985

[54] TRANSMISSION CIRCUIT FOR AN ELECTRONIC TELEPHONE SET

[75] Inventors: Josephus J. A. Geboers; Daniël J. G. Janssen, both of Eindhoven, Netherlands

[73] Assignee: U.S. Philips Corporation, New York, N.Y.

[21] Appl. No.: 461,717

[22] Filed: Jan. 28, 1983

[30] Foreign Application Priority Data

Feb. 19, 1982 [NL] Netherlands ............... 8200666

[51] Int. Cl.³ ............................................. H04M 1/60
[52] U.S. Cl. .............................. 179/81 R; 179/81 B
[58] Field of Search ................. 179/81 R, 81 B, 77, 179/70, 90 K, 170 D, 170 NC, 170 T; 323/223

[56] References Cited

U.S. PATENT DOCUMENTS

| | | | |
|---|---|---|---|
| 4,309,573 | 1/1982 | Grantland et al. | 179/81 B |
| 4,332,984 | 6/1982 | Davis et al. | 179/81 R |
| 4,376,876 | 3/1983 | Versteeg et al. | 179/81 B X |
| 4,394,542 | 7/1983 | Hara et al. | 179/81 B |
| 4,400,588 | 3/1983 | Stobbs et al. | 179/81 R |
| 4,406,926 | 9/1983 | Duncan | 179/90 K X |

Primary Examiner—Keith E. George
Attorney, Agent, or Firm—Thomas A. Briody; William J. Streeter

[57] ABSTRACT

A transmission circuit for an electronic telephone set has a transmit circuit which as far as direct current is concerned is connected in parallel with the series arrangement of a logic circuit, a current source and a receive circuit. This enables the voltage space of the transmit circuit to be equal to the line voltage so that a maximum transmit level can be achieved.

3 Claims, 1 Drawing Figure

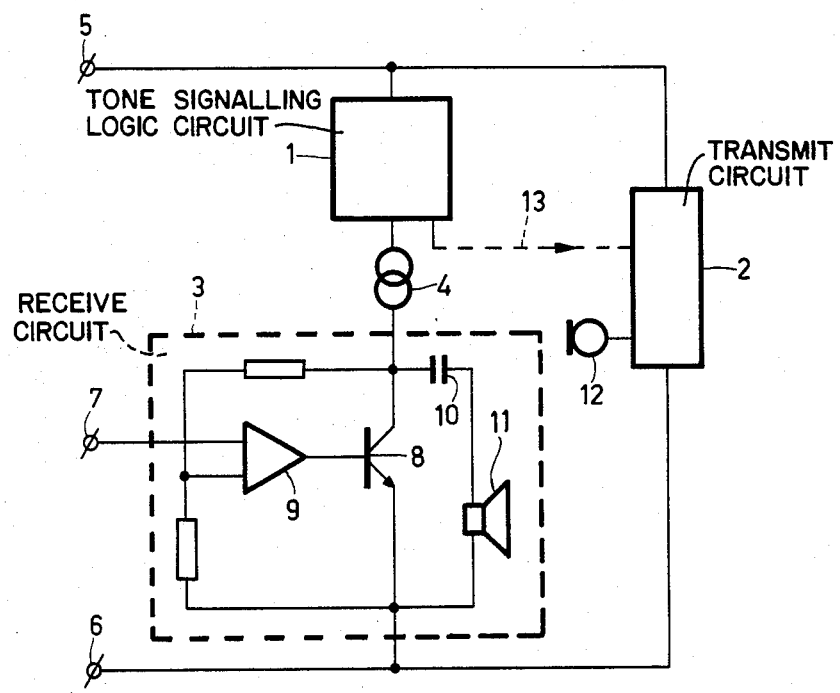

TRANSMISSION CIRCUIT FOR AN ELECTRONIC TELEPHONE SET

BACKGROUND OF THE INVENTION

The invention relates to a transmission circuit for an electronic telephone set, comprising a receive circuit, a transmit circuit and a logic circuit, two of these circuits being connected as direct current series circuit.

Such a transmission circuit is disclosed in "The Proceedings of the 2nd International Symposium and Subscriber Loops and Services", May 3-7, 1976 pages 112 to 117, inclusive.

An electronic telephone set comprises a transmission circuit for transmitting information and for signalling purposes. The receiving circuit of the transmission circuit is used for the reception and amplification of the audio signals received by the telephone set through the subscriber line. The logic circuit of the transmission circuit, when dialing push-buttons are employed, is used to generate logic signals to obtain a frequency combination tone signal representing the chosen number.

The transmit circuit of the transmission circuit is used for amplifying and transmitting the audio signals which are conveyed to the exchange through the subscriber line. Generally, and particularly for long subscriber lines, it is desirable for the audio signal transmitted to the exchange by the transmit circuit to have the largest possible voltage amplitude so as to satisfy the requirement imposed by the regulatory authorities that the power of this audio signal must be above a minimum value set forth by the regulatory.

The receive circuit, the transmit circuit and the logic circuit all receive their supply direct current through the subscriber line to which the telephone set is connected. Each of the circuits can only function if its supply direct voltage exceeds a certain minimum value, which minimum supply voltage generally has a value which is different for each one of the circuits. The maximum supply current the subscriber line is capable of producing depends inter alia on the line impedance and consequently on the length of the subscriber line. It is possible that with the minimum supply voltage required by the circuits, a long subscriber line cannot produce the current required by the authorities.

SUMMARY OF THE INVENTION

The invention has for its object to provide a transmission circuit for an electronic telephone set which will operate at a minimal supply current, and in which the signal voltage swing of the transmit circuit is only limited by the direct line voltage at the subscriber connection.

The invention provides a transmission circuit, having a series arrangement for direct current supply formed by the receive circuit and the logic circuit. For direct current supply, the transmit circuit is connected in parallel with the series arrangement. The logic circuit is in series arrangement with the transmit circuit for tone signals.

With these measures, the supply current flowing through the receive circuit is also used as the supply current for the logic circuit, so that the subscriber line need not produce the sum of these two supply currents. These measures are possible because the required minimal supply voltage of the logic circuit, and the required minimal supply voltage of the receive circuit, are each less than the supply voltage required by the transmit circuit. A further advantage of arranging the transmit circuit in parallel with the series arrangement of the logic circuit and the receive circuit, is that the supply voltage of the transmit amplifier is not limited. The supply voltage may be made equal to the line voltage, as a result of which the signal voltage swing of the transmission amplifier is substantially equal to the line voltage.

It should be noted that the above-identified publication describes a transmission circuit in which the output stage of the transmit amplifier for direct current is in series through a current stabilizing circuit with a parallel circuit comprising the receive amplifier and the remaining parts of the transmission amplifier. However, this configuration has the disadvantage that the signal voltage swing of the transmit amplifier, and consequently the amplitude of the transmit signal, is limited by the voltage drop across the current stabilizing circuit and the receive amplifier.

It is possible for the voltage between the connection terminals of the logic circuit and the voltage between the connection terminals of the receive circuit to have an a.c. voltage component which is not the result of the operation of the relevant circuit. In order to prevent any unwanted influence of this a.c. voltage on each of these circuits, the transmission circuit may incorporate a current source circuit which forms part of the series arrangement, which current source circuit is connected to the logic circuit and to the receive circuit. This measure reduces the possibility of mutual interaction between the logic circuit and the receive circuit for a.c. voltages, while voltage changes on the subscriber line also have a reduced effect on the voltage across each of these circuits.

The presence of the current source circuit in the transmission circuit further facilitates the signal transmission from the receive circuit to the electro-acoustical transducer, as it enables a receive circuit to be realized which has a minimum voltage drop. To this end the transmission circuit may be characterized in that receive circuit incorporates a series arrangement of a capacitor and an electro-acoustical transducer, which series circuit is in parallel with the output transistor of the receive circuit. This measure enables the maximum voltage between the connection terminals of the receive circuit to be only slightly higher than the voltage swing of the a.c. voltage across the electro-acoustical transducer.

An embodiment of the invention and its advantages will now be described.

DESCRIPTION OF THE DRAWING

The sole FIGURE of the accompanying drawing shows an embodiment of a transmission circuit in accordance with one embodiment of the invention.

DESCRIPTION OF THE PREFERRED EMBODIMENT

The transmission circuit shown in the FIGURE is formed by a transmit circuit 2 which for direct current is in parallel with a series arrangement for direct current, formed by a logic circuit 1, a current source circuit 4 and an output transistor 8 of a receive circuit 3. A series circuit of a capacitor 10 and an electro-acoustical transducer (loudspeaker or earpiece) 11 is in parallel with the output transistor 8.

The transmit circuit 2 and the series arrangement 1, 4, 8 are both connected to the subscriber line through the connection terminals 5 and 6 and the subscriber set hook contact, not shown in the FIGURE. In addition, for tone signals the logic circuit 1 is series connected by a control line 13 to the transmit circuit 2 to enable transmission of the tone signals for tone push-button signalling generated in the logic circuit 1 to the subscriber line.

The microphone 12 is also connected to the transmit circuit 2. The transmit circuit applies the audio signals to be transmitted and the signals received from the logic circuit to the subscriber line through a hybrid circuit, not shown in the FIGURE.

The logic circuit 1 is supplied by a current whose magnitude is determined by the current source 4. This logic circuit 1 is, for example, formed in what is commonly referred to as the I²L-technology ("integrated injection logic"), which has the advantage that the minimum supply voltage required for an undisturbed operation has a low value, for example a value of 0.7 V.

The current source 4 fixes the current through the logic circuit 1 at a constant value of, for example, 4 mA. In addition, this current source has a high differential impedance so that the presence of the series arrangement 1, 4, 8 has no influence on the set impedance of, for example, 600Ω prescribed by the regulatory authorities. This current source is preferably of a type which at a low voltage across its terminals (the operating voltage) still produces a constant current. A current source as disclosed in U.S. Pat. No. 4,117,391 may, for example, be chosen. This current source has a minimum working voltage of, for example, 0.3 V.

The audio signal which is received through the subscriber line is applied, in a manner not shown, to the input 7 of the receive circuit 3. The pre-amplifier 9, which forms part of the receive circuit 3, drives the base of the output transistor 8. As a result this transistor is made conductive or non-conductive to a greater or lesser extent at the rate of the audio signal, which results in a larger or smaller portion of the constant current from the current source being forced to flow through the series circuit of the capacitor 10 and the electro-acoustical transducer 11, so that the sum of the alternating currents in transistor 8 and in the series circuit 10, 11 remains equal to the constant current produced by the current source 4.

The capacitor 10 blocks direct current. The value of capacitor 10 is chosen to be such that the voltage drop across it in the audio frequency range is small compared with the drop across electro-acoustical transducer 11.

The series circuit 10, 11 is arranged in parallel with the collector-emitter path of transistor 8. The alternating current portion which flows through this series arrangement forms the audio signals which generates the sound in the electro-acoustical transducer 11.

A typical value for the impedance of the electro-acoustical transducer 11 is, for example, 200Ω. By means of a signal current of, for example, 4 mA, a voltage swing of 0.8 V is then produced across the collector-emitter path of transistor 8. The minimum collector-emitter voltage of this transistor required for linear operation is of the order of magnitude of, for example, 0.2 V. The sum of the minimum transistor voltage of 0.2 V, the signal voltage swing of 0.8 V, the minimum voltage drop across the current source 4 of 0.3 V and the voltage of 0.7 V across the logic circuit is 2 V. This consequently is the minimum voltage at which the series arrangement 1, 4, 8 can still function in an undisturbed manner.

The above numerical example clearly shows the advantage of the illustrated arrangement of the logic circuit 1, the receive circuit 3 and the transmit circuit 2. The maximum possible voltage swing of the signal supplied by the transmit circuit 2 is 2 V, which value would be approximately halved if the transmit circuit 2 were in series with the logic circuit 1 or with the receive circuit 3.

What is claimed is:

1. A transmission circuit for an electronic telephone set comprising a receive circuit, a transmit circuit, and a logic circuit for generating tone signals; said logic circuit being in series arrangement with said transmit circuit for such tone signals and forming a series arrangement with said receive circuit for direct current; and for direct current said transmit circuit being connected in parallel with said direct current series arrangement of said logic circuit and said receive circuit.

2. The transmission circuit of claim 1 wherein said direct current series arrangement of said logic circuit and said receive circuit further comprises a current source connected in series between said logic circuit and said receive circuit for reducing the possibility of mutual interaction between said circuits for alternating current voltages.

3. The transmission circuit of claim 2 wherein said receive circuit comprises amplifier means having a transistor output circuit, an electro-acoustic transducer and a capacitor; said electro-acoustic transducer being parallel connected to said transducer output circuit through said capacitor.

* * * * *